US012580501B2

(12) United States Patent
Ito

(10) Patent No.: US 12,580,501 B2
(45) Date of Patent: Mar. 17, 2026

(54) VIBRATION WAVE RADIATING DEVICE

(71) Applicant: Murata Manufacturing Co., Ltd.,
Nagaokakyo (JP)

(72) Inventor: Ryota Ito, Nagaokakyo (JP)

(73) Assignee: **MURATA MANUFACTURING CO.,
LTD.**, Kyoto (JP)

( * ) Notice: Subject to any disclaimer, the term of this
patent is extended or adjusted under 35
U.S.C. 154(b) by 212 days.

(21) Appl. No.: 18/404,938

(22) Filed: Jan. 5, 2024

(65) Prior Publication Data

US 2024/0136956 A1 Apr. 25, 2024
US 2024/0235432 A9 Jul. 11, 2024

Related U.S. Application Data

(63) Continuation of application No.
PCT/JP2022/010563, filed on Mar. 10, 2022.

(30) Foreign Application Priority Data

Jul. 26, 2021 (JP) .................................. 2021-121691

(51) Int. Cl.
*H02N 99/00* (2006.01)

(52) U.S. Cl.
CPC .................................... *H02N 99/00* (2013.01)

(58) Field of Classification Search
CPC .......... H02N 99/00; H04R 1/34; H04R 17/00;
H10N 30/20; H10N 35/00
See application file for complete search history.

(56) References Cited

U.S. PATENT DOCUMENTS 6,087,760 A 7/2000 Yamaguchi et al.

FOREIGN PATENT DOCUMENTS

JP H09327095 A 12/1997

OTHER PUBLICATIONS

International Search Report in PCT/JP2022/010563, mailed Apr. 26,
2022, 3 pages.
Written Opinion in PCT/JP2022/010563, mailed Apr. 26, 2022, 4
pages.

*Primary Examiner* — Maged M Almawri
*Assistant Examiner* — Ethan Nguyen Vo
(74) *Attorney, Agent, or Firm* — Keating & Bennett, LLP

(57) ABSTRACT

In a vibration wave radiating device, when a distance
between a connection portion and a reflecting plane portion
in a direction orthogonal to the reflecting plane portion is
TD, an angle defined by a virtual line parallel to the
reflecting plane portion and a back surface of a vibrating
portion in a longitudinal section is $\theta$, a shortest distance
between a peripheral edge of the back surface at an end of
the vibrating portion opposite to the connection portion and
a peripheral edge of the reflecting plane portion is L, and a
wavelength of a vibration wave emitted from the vibrating
portion is $\lambda$, a relationship indicated by $0.78\lambda \le L \le 1.19\lambda$ or
$1.5\lambda \le L \le 2.14\lambda$ is satisfied when TD=0 and $35° \le \theta \le 55°$.

5 Claims, 8 Drawing Sheets

SOUND PRESSURE/VI BRATION VELOCITY [Pa/(m/s)]

VIBRATION WAVE RADIATING DEVICE

CROSS REFERENCE TO RELATED APPLICATIONS

This application claims the benefit of priority to Japanese Patent Application No. 2021-121691 filed on Jul. 26, 2021 and is a Continuation Application of PCT Application No. PCT/JP2022/010563 filed on Mar. 10, 2022. The entire contents of each application are hereby incorporated herein by reference.

BACKGROUND OF THE INVENTION

1. Field of the Invention

The present invention relates to a vibration wave radiating device.

2. Description of the Related Art

Japanese Unexamined Patent Application Publication No. 9-327095 discloses the structure of an ultrasonic transmitter. The ultrasonic transmitter described in Japanese Unexamined Patent Application Publication No. 9-327095 includes a vibrator, a cone vibrator, a conical horn, and a pedestal.

SUMMARY OF THE INVENTION

The relationship between the size of the cone vibrator and the size of the reflecting plane must be defined to increase the sound pressure by adjusting the phase of the ultrasonic reflected wave emitted from the back surface of the cone vibrator, but Japanese Unexamined Patent Application Publication No. 9-327095 does not consider this relationship.

Preferred embodiments of the present invention provide vibration wave radiating devices that each can generate a vibration wave having a high sound pressure.

A vibration wave radiating device according to a preferred embodiment of the present invention includes a vibrator to generate vibration, a vibrating body, and a reflecting plane portion. The vibrating body is connected to the vibrator and includes a front surface and a back surface closer to the vibrator and facing away from the front surface. The reflecting plane portion faces the back surface of the vibrating body with a space therebetween. The vibrating body includes a connection portion and a vibrating portion. The connection portion is connected to the vibrator. The vibrating portion extends away from the reflecting plane portion and extends from an end portion of the connection portion opposite to the vibrator and includes the back surface that faces the reflecting plane portion. The vibrating portion has a tubular shape linearly increasing in diameter from the connection portion in the longitudinal section. The peripheral edge of the reflecting plane portion is coaxial with a central axis of the vibrating portion and located outside the vibrating portion as viewed in a direction orthogonal to the reflecting plane portion. When a distance between the connection portion and the reflecting plane portion in the direction orthogonal to the reflecting plane portion is TD, an angle defined by a virtual line parallel to the reflecting plane portion and the back surface of the vibrating portion in the longitudinal section is θ, a shortest distance between a peripheral edge of the back surface at an end of the vibrating portion opposite to the connection portion and a peripheral edge of the reflecting plane portion is L, and a wavelength of the vibration wave emitted from the vibrating portion is λ, a relationship indicated by 0.78λ≤L≤1.19λ or 1.5λ≤L≤2.14λ is satisfied when TD=0 and 35°≤θ≤55°.

According to preferred embodiments of the present invention, a vibration wave with a high sound pressure can be generated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figures 1, 2:
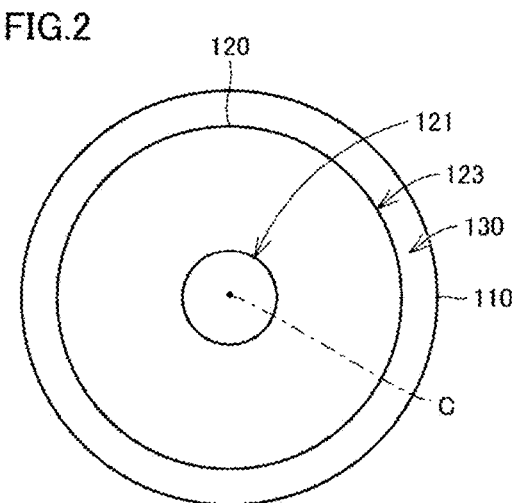
FIG. 1 is a longitudinal sectional view illustrating the structure of a vibration wave radiating device according to preferred embodiment 1 of the present invention.
FIG. 2 is a plan view of the vibration wave radiating device in FIG. 1 as viewed in the direction of arrow II.

Vibration wave radiating devices according to preferred embodiments of the present invention will be described below with reference to the drawings. In the following description of preferred embodiments, the same or corresponding portions in the figures are given the same reference numerals to omit the description thereof.

Preferred Embodiment 1

FIG. 1 is a longitudinal sectional view illustrating the structure of a vibration wave radiating device according to preferred embodiment 1 of the present invention. FIG. 2 is a plan view of the vibration wave radiating device in FIG. 1 as viewed in the direction of arrow II. As illustrated in FIGS. 1 and 2, a vibration wave radiating device 100 according to preferred embodiment 1 of the present invention includes a vibrator 110, a vibrating body 120, and a reflecting plane portion 130.

The vibrator 110 generates vibration. In the present preferred embodiment, the vibrator 110 includes an electromechanical conversion element 111 and a vibration transmission body 112. The electromechanical conversion element 111 may include a piezoelectric element, a magnetostrictive element, an electrostrictive element, or the like. The vibration transmission body 112 may be made of a metal or a resin. The vibrator 110 has a cylindrical or substantially cylindrical shape.

The vibrator 110 may be a vibrator in which one or more electromechanical conversion elements, such as a Langevin vibrator, a monomorph vibrator, or a bimorph vibrator, and one or more other members are integrated with each other.

The vibrating body 120 is connected to the vibrator 110 and includes a front surface 120f and a back surface 120b that is close to the vibrator 110 and faces away from the front surface 120f. The vibrating body 120 includes the connection portion 121 and the vibrating portion 122.

The connection portion 121 is connected to the vibrator 110. In the present preferred embodiment, the connection portion 121 has a tubular shape extending in a direction orthogonal to the reflecting plane portion 130. However, the shape of the connection portion 121 is not limited to a tubular shape and may also be a pin shape, a hemispherical shape, or the like.

The vibrating portion 122 extends away from the reflecting plane portion 130 while spreading from an end portion of the connection portion 121 opposite to the vibrator 110 and includes the back surface 120b that faces the reflecting plane portion 130. The vibrating portion 122 has a tubular shape that extends while linearly increasing in diameter from the connection portion 121 in a longitudinal section. That is, the vibrating portion 122 has a conical horn shape that is rotationally symmetric about a central axis C. A peripheral edge 123 of the back surface 120b at the end of the vibrating portion 122 opposite to the connection portion 121 has an annular shape. It should be noted that the shape of the vibrating portion 122 is not limited to a conical horn shape and may be any shape that has an open space between the back surface 120b of the vibrating portion 122 and the reflecting plane portion 130 in which a vibration wave propagates.

The material of the vibrating body 120 may also be a resin or a metal, such as aluminum alloy, stainless steel, nickel alloy, or copper alloy. The vibrating body 120 may be made of the same material as an element of the vibrator 110 or the reflecting plane portion 130 and integrated with the vibrator 110 or the reflecting plane portion 130 or may be a different member connected to the element of the vibrator 110 or the reflecting plane portion 130.

The reflecting plane portion 130 faces the back surface 120b of the vibrating body 120 with a space therebetween. In the present preferred embodiment, the reflecting plane portion 130 is a surface of the vibrator 110 close to the vibrating body 120. It should be noted that the reflecting plane portion 130 may be a different member from the vibrator 110. In this case, the material of the reflecting plane portion 130 may also be a resin or a metal, such as aluminum alloy, stainless steel, nickel alloy, or copper alloy.

As illustrated in FIG. 2, the peripheral edge of the reflecting plane portion 130 has a circular shape that is coaxial with the central axis C of the vibrating portion 122 and located outside the vibrating portion 122 as viewed in the direction orthogonal to the reflecting plane portion 130. That is, the radius of the peripheral edge of the reflecting plane portion 130 is greater than the radius of the peripheral edge of the vibrating portion 122. It should be noted that the shape of the peripheral edge of the reflecting plane portion 130 is not limited to a circular shape as viewed in the direction orthogonal to the reflecting plane portion 130.

Here, the following describes the mechanism by which the sound pressure of the vibration wave radiated from the vibration wave radiating device 100 changes according to the relationship between the size of the vibrating portion 122 and the size of the reflecting plane portion 130.

Figures 3, 4:
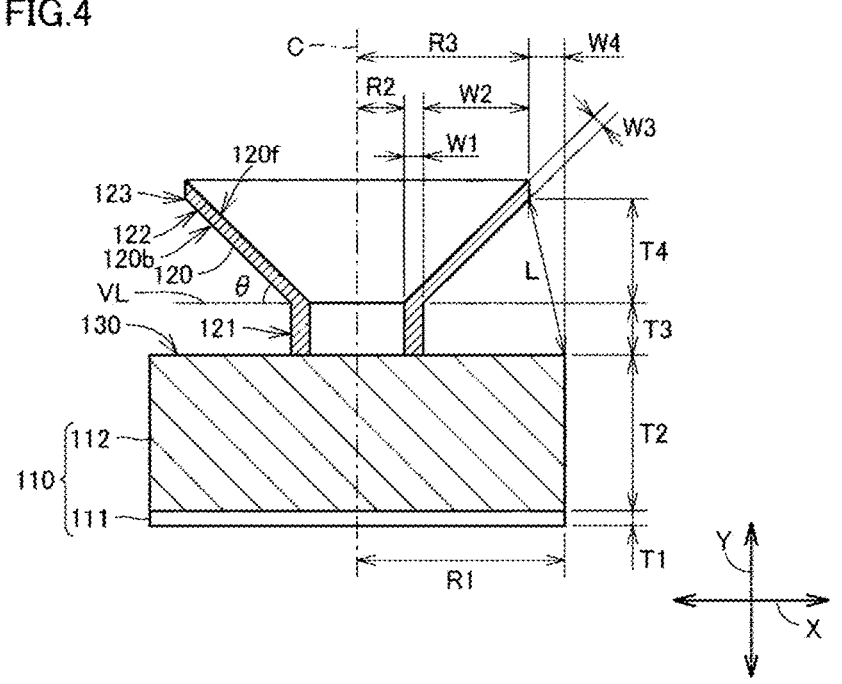
FIG. 3 is a partial sectional view schematically illustrating changes in the phase of a reflected wave of a vibration wave radiated from the back surface of a vibrating portion according to the size of a reflecting plane portion.
FIG. 4 is a longitudinal sectional view illustrating the dimensional conditions of a simulation analysis of the vibration wave radiating device according to preferred embodiment 1 of the present invention.

FIG. 3 is a partial sectional view schematically illustrating changes in the phase of the reflected wave of the vibration wave radiated from the back surface of the vibrating portion according to the size of a reflecting plane portion.

As illustrated in FIG. 3, when the vibrating body 120 vibrates, the vibrating portion 122 swings as indicated by arrow 1. As a result, a vibration wave U1 is radiated upward in FIG. 3 from the front surface 120f of the vibrating portion 122. A vibration wave U2 is radiated downward in FIG. 3 from the back surface 120b of the vibrating portion 122. The vibration wave U2 is reflected by the reflecting plane portion 130 and propagates upward in FIG. 3.

If the radius of the peripheral edge of the reflecting plane portion 130 is smaller than the radius of the peripheral edge of the vibrating portion 122, the vibration wave U2 reflected by the reflecting plane portion 130 cannot sufficiently propagate upward in FIG. 3.

On the other hand, if the radius of the peripheral edge of the reflecting plane portion 130 is larger than the radius of the peripheral edge of the vibrating portion 122, the phases of the reflected waves deviate according to the travel distance of the vibration wave U2 to the reflecting plane portion 130. In FIG. 3, a reflected wave U3 and a reflected wave U5 are in the same phase with the vibration wave U1, and a reflected wave U4 is in the opposite phase with the vibration wave U1. In some cases, the reflected waves do not sufficiently propagate upward in FIG. 3 due to the interference between these reflected waves. That is, the size of the reflecting plane portion 130 need be appropriately set according to the size of the vibrating portion 122 to increase the sound pressure of the vibration wave radiated from the vibration wave radiating device.

Specifically, when the position of the peripheral edge of the reflecting plane portion 130 is set to S1, the sound pressure of the vibration wave radiated from the vibration wave radiating device can be increased by the reflected wave U3. When the position of the peripheral edge of the reflecting plane portion 130 is set to S2, since the vibration wave radiated from the vibration wave radiating device is weakened by addition of the reflected wave U4, the sound pressure of the vibration wave cannot be increased. When the position of the peripheral edge of the reflecting plane portion 130 is set to S3, the sound pressure of the vibration wave radiated from the vibration wave radiating device can be increased by addition of the reflected wave U5. As described above, when the reflecting plane portion 130 is enlarged, a region in which the vibration wave is strengthened and a region in which the vibration wave is weakened alternately appear.

The following describes the results of a simulation analysis with a finite element method of the vibration wave radiating device according to preferred embodiment 1 of the present invention. It should be noted that the acoustic velocity of air was set to 340 m/s in the following simulation analysis, for example.

FIG. 4 is a longitudinal sectional view illustrating the dimensional conditions of the simulation analysis of the vibration wave radiating device according to preferred embodiment 1 of the present invention. In the longitudinal section illustrated in FIG. 4, the direction parallel to the reflecting plane portion 130 is assumed to be the X-axis direction, and the direction orthogonal to the reflecting plane portion 130 is assumed to be the Y-axis direction.

The radius dimension of the vibrator 110, that is, the radius of the peripheral edge of the reflecting plane portion 130 is assumed to be R1. The inner radius dimension of the connection portion 121 is assumed to be R2. The radius dimension of the peripheral edge of the back surface 120b at the end of the vibrating portion 122 is assumed to be R3.

The thickness dimension of the electromechanical conversion element 111 is assumed to be T1. The thickness dimension of the vibration transmission body 112 is assumed to be T2. The height dimension of the connection portion 121 is assumed to be T3. The height dimension of the back surface 120b of the vibrating portion 122 in the Y-axis direction is assumed to be T4.

The thickness dimension of the connection portion 121 is assumed to be W1. The width dimension of the back surface 120b of the vibrating portion 122 in the X-axis direction is assumed to be W2. The thickness dimension of the vibrating portion 122 is assumed to be W3. The distance in the X-axis direction between the peripheral edge 123 of the back surface 120b at the end of the vibrating portion 122 opposite to the connection portion 121 and the peripheral edge of the reflecting plane portion 130 is assumed to be W4.

The distance in the Y-axis direction between the connection portion 121 and the reflecting plane portion 130 is assumed to be TD. In the longitudinal section illustrated in FIG. 4, the angle defined by a virtual line VL parallel to the reflecting plane portion 130 and the back surface 120b of the vibrating portion 122 is assumed to be θ. The shortest distance between the peripheral edge 123 of the back surface 120b at the end of the vibrating portion 122 opposite to the connection portion 121 and the peripheral edge of the reflecting plane portion 130 is assumed to be L. The wavelength of the vibration wave emitted from the vibrating portion 122 is assumed to be λ.

A simulation analysis was performed when TD=0 and angle θ=35°, 45°, and 55° in the range 5.4 mm≤R1≤15 mm (0 mm≤W4≤7 mm) where R1 was a parameter, for example.

Other dimensions were as follows: R2=3.5 mm, R3=5.6 mm, T1=0.4 mm, T2=13 mm, W1=0.6 mm, W2=1.5 mm, and W3=0.6 mm, for example. The values of T3 and T4 were adjusted as appropriate according to angle θ by assuming that T3+T4=2.2 mm, for example. Alternatively, R2 may also be not less than 0 mm and not more than 10 mm, for example. T1 may also be not less than 0.1 mm and not more than 5 mm, for example. T2 may also be not less than 0.1 mm and not more than 30 mm, for example. T3 may also be not less than 0 mm and not more than 15 mm, for example. T4 may also be not less than 0.2 mm and not more than 10 mm, for example. W1 may also be not less than 0.1 mm and not more than 10 mm, for example. W2 may also be not less than 0.2 mm and not more than 10 mm, for example. W3 may also be not less than 0.1 mm and not more than 5 mm, for example. The shortest distance (T3+T4) between the reflecting plane portion 130 and the peripheral edge 123 of the back surface 120b at the end of the vibrating portion 122 opposite to the connection portion 121 preferably meets the relationship indicated by 0.5λ≤T3+T4≤0.9λ, for example.

A piezoelectric element was used as the electromechanical conversion element 111. The materials of the vibration transmission body 112 and the vibrating body 120 were aluminum alloy (A7075).

The vibrator 110 was driven by applying a voltage of, for example, 2 Vpp with a frequency of 114 kHz (λ=2.98 mm) to the piezoelectric body. In the vibration wave radiating device according to preferred embodiment 1 of the present invention, the maximum sound pressure of the vibration wave at a position 50 mm away from the end of the vibrating body 120 in the Y-axis direction on the central axis C before the vibrator 110 was driven was calculated.

Figure 5:
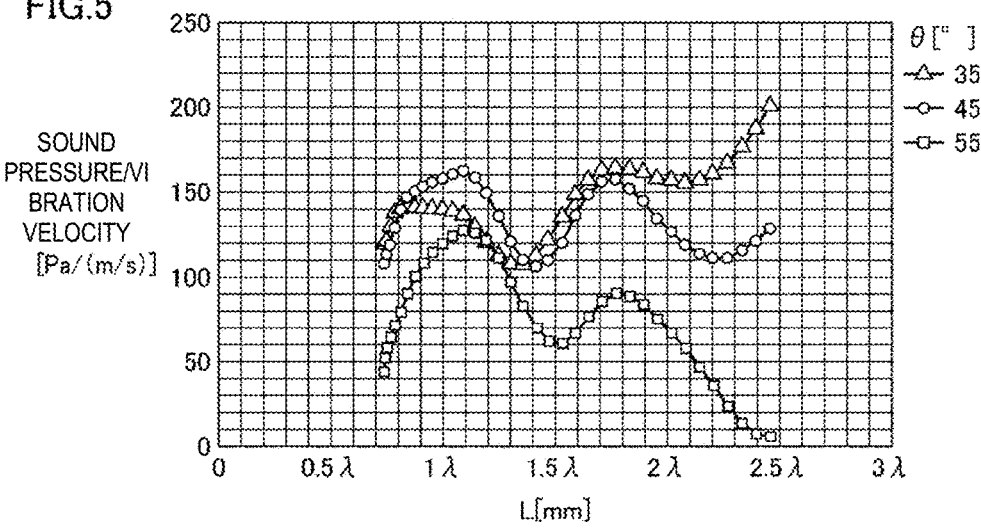
FIG. 5 is a graph illustrating the relationship between the sound pressure per unit vibration velocity and a shortest distance L in the simulation analysis of the vibration wave radiating device according to preferred embodiment 1 of the present invention.

FIG. 5 is a graph illustrating the relationship between the sound pressure per unit vibration velocity and the shortest distance L in the simulation analysis of the vibration wave radiating device according to preferred embodiment 1 of the present invention. In FIG. 5, the vertical axis represents the sound pressure (Pa/(m/s)) per unit vibration velocity, and the horizontal axis represents the shortest distance L (mm).

As illustrated in FIG. 5, the sound pressure per unit vibration velocity periodically varied with the shortest distance L when angle θ was 35°, 45°, and 55°, for example. This is because the state of interference between the reflected waves changes according to the size of the reflecting plane portion 130. The following example conditions are preferably met to increase the sound pressure per unit vibration velocity.

When angle θ=35°, the relationship indicated by 0.75λ≤L≤1.19λ or 1.47λ≤L is preferably met. In addition, the relationship indicated by 1.65λ≤L≤1.96λ or 2.14λ≤L is more preferably met.

When angle θ=45°, the relationship indicated by 0.78λ≤L≤1.3λ or 1.5λ≤L is preferably met. In addition, the relationship indicated by 0.84λ≤L≤1.19λ or 1.65λ≤L≤1.89λ is more preferably met.

When angle θ=55°, the relationship indicated by 0.74Δ≤L≤2.14λ is preferably met. In addition, the relationship indicated by 0.75λ≤L≤2.08λ is more preferably met.

In accordance with the results of the simulation analysis described above, the relationship indicated by 0.78λ≤L≤1.19λ or 1.5λ≤L≤2.14λ is preferably met when TD=0 and 35°≤θ≤55°, for example, to increase the sound pressure per unit vibration velocity in the vibration wave radiating device according to preferred embodiment 1 of the present invention. In addition, the relationship indicated by $0.78\lambda \leq L \leq 1.19\lambda$ or $1.5\lambda \leq L \leq 2\lambda$ is preferably met when TD=0 and $35° \leq \theta \leq 55°$, for example, to prevent the vibration wave radiating device from becoming larger.

Preferred Embodiment 2

A vibration wave radiating device according to preferred embodiment 2 of the present invention will be described below with reference to the drawings. Since the vibration wave radiating device according to preferred embodiment 2 of the present invention differs from the vibration wave radiating device 100 according to preferred embodiment 1 of the present invention in mainly the structures of the vibrator and the vibrating body, the structures similar to those of the vibration wave radiating device 100 according to preferred embodiment 1 of the present invention will not be described.

Figure 6:
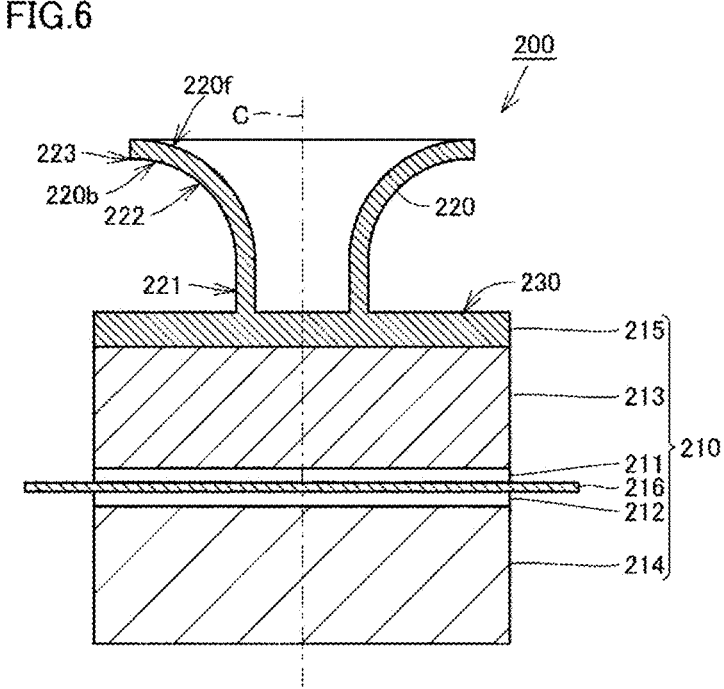
FIG. 6 is a longitudinal sectional view illustrating the structure of a vibration wave radiating device according to preferred embodiment 2 of the present invention.

FIG. 6 is a longitudinal sectional view illustrating the structure of the vibration wave radiating device according to preferred embodiment 2 of the present invention. As illustrated in FIG. 6, a vibration wave radiating device 200 according to preferred embodiment 2 of the present invention includes a vibrator 210, a vibrating body 220, and a reflecting plane portion 230.

In the present preferred embodiment, the vibrator 210 includes a first electromechanical conversion element 211, a second electromechanical conversion element 212, a first vibration transmission body 213, a second vibration transmission body 214, a third vibration transmission body 215, and a support body 216. The vibrator 210 is a so-called Langevin vibrator. The vibrator 210 has a substantially cylindrical shape. The support body 216 projects like a disc from the outer peripheral surface of the vibrator 210. It should be noted that the support body 216 need only project from the outer peripheral surface of the vibrator 210, and the shape of the support body 216 is not limited to a disc shape. In addition, the support body 216 need not project from the entire outer circumference of the vibrator 210 and may project from a part of the outer circumference of the vibrator 210.

The first electromechanical conversion element 211, the first vibration transmission body 213, and the third vibration transmission body 215 are stacked in this order on one surface of the support body 216. The second electromechanical conversion element 212 and the second vibration transmission body 214 are stacked in this order on the other surface of the support body 216.

Each of the first electromechanical conversion element 211 and the second electromechanical conversion element 212 may include a piezoelectric element, a magnetostrictive element, an electrostrictive element, or the like. Each of the first vibration transmission body 213, the second vibration transmission body 214, and the third vibration transmission body 215 may be made of a metal or a resin. The support body 216 may be made of a metal or a resin.

The vibrating body 220 is connected to the vibrator 210 and includes a front surface 220f and a back surface 220b that is close to the vibrator 210 and faces away from the front surface 220f. The vibrating body 220 includes a connection portion 221 and a vibrating portion 222.

The connection portion 221 is connected to the vibrator 210. In the present preferred embodiment, the connection portion 221 has a tubular shape extending in a direction orthogonal to the reflecting plane portion 230. However, the shape of the connection portion 221 is not limited to a tubular shape and may also be a pin shape, a hemispherical shape, or the like.

The vibrating portion 222 extends away from the reflecting plane portion 230 while spreading from an end portion of the connection portion 221 opposite to the vibrator 210 and includes the back surface 220b that faces the reflecting plane portion 230. In the longitudinal section, the vibrating portion 222 has a tubular shape that extends while increasing in diameter like a convex arc or a convex elliptic arc from the connection portion 221 to the front surface 220f. That is, the vibrating portion 222 has a bugle shape that is rotationally symmetric about the central axis C. The peripheral edge 223 of the back surface 220b at the end of the vibrating portion 222 opposite to the connection portion 221 has an annular shape. It should be noted that the shape of the vibrating portion 222 is not limited to a bugle shape and may be any shape that has an open space between the back surface 220b of the vibrating portion 222 and the reflecting plane portion 230 in which the vibration wave propagates.

The material of the vibrating body 220 may also be a resin or a metal, such as aluminum alloy, stainless steel, nickel alloy, or copper alloy. The vibrating body 220 may be made of the same material as the member of the vibrator 210 or the reflecting plane portion 230 and integrated with the vibrator 210 or the reflecting plane portion 230 or may be a different member connected to the member of the vibrator 210 or the reflecting plane portion 230.

The reflecting plane portion 230 faces the back surface 220b of the vibrating body 220 with a space therebetween. In the present preferred embodiment, the reflecting plane portion 230 is a surface of the vibrator 210 close to the vibrating body 220. It should be noted that the reflecting plane portion 230 may be a different member from the vibrator 210. In this case, the material of the reflecting plane portion 230 may also be a resin or a metal, such as aluminum alloy, stainless steel, nickel alloy, or copper alloy.

The peripheral edge of the reflecting plane portion 230 has a circular shape that is coaxial with the central axis C of the vibrating portion 222 and located outside the vibrating portion 222 as viewed in the direction orthogonal to the reflecting plane portion 230. That is, the radius of the peripheral edge of the reflecting plane portion 230 is greater than the radius of the peripheral edge of the vibrating portion 222. It should be noted that the shape of the peripheral edge of the reflecting plane portion 230 is not limited to a circular shape as viewed in the direction orthogonal to the reflecting plane portion 230.

The following describes the results of a simulation analysis with a finite element method of the vibration wave radiating device according to preferred embodiment 2 of the present invention.

Figure 7:
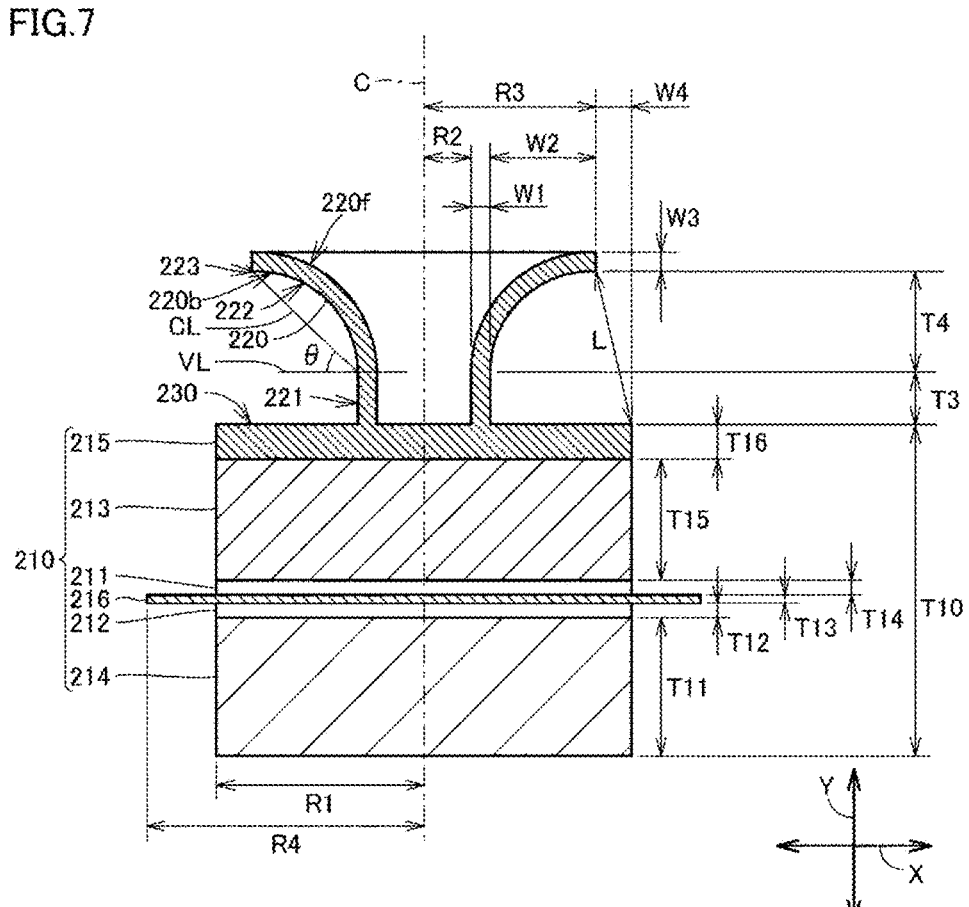
FIG. 7 is a longitudinal sectional view illustrating the dimensional conditions of a simulation analysis of the vibration wave radiating device according to preferred embodiment 2 of the present invention.

FIG. 7 is a longitudinal sectional view illustrating the example dimensional conditions of the simulation analysis of the vibration wave radiating device according to preferred embodiment 2 of the present invention. In the longitudinal section illustrated in FIG. 7, the direction parallel to the reflecting plane portion 230 is assumed to be the X-axis direction, and the direction orthogonal to the reflecting plane portion 230 is assumed to be the Y-axis direction.

The radius of the vibrator 210, that is, the radius dimension of the peripheral edge of the reflecting plane portion 230 is assumed to be R1. The inner radius dimension of the connection portion 221 is assumed to be R2. The radius dimension of the peripheral edge of the back surface 220b at the end of the vibrating portion 222 is assumed to be R3. The radius dimension of the peripheral edge of the support body 216 is assumed to be R4.

The thickness dimension of the vibrator 210 is assumed to be T10. The thickness dimension of the second vibration transmission body 214 is assumed to be T11. The thickness dimension of the second electromechanical conversion element 212 is assumed to be T12. The thickness dimension of the support body 216 is assumed to be T13. The thickness dimension of the first electromechanical conversion element 211 is assumed to be T14. The thickness dimension of the first vibration transmission body 213 is assumed to be T15. The thickness dimension of the third vibration transmission body 215 is assumed to be T16.

The height dimension of the connection portion 221 is assumed to be T3. The height dimension of the back surface 220$b$ of the vibrating portion 222 in the Y-axis direction is assumed to be T4.

The thickness dimension of the connection portion 221 is assumed to be W1. The width dimension of the back surface 220$b$ of the vibrating portion 222 in the X-axis direction is assumed to be W2. The thickness dimension of the vibrating portion 222 is assumed to be W3. The distance in the X-axis direction between the peripheral edge 223 of the back surface 220$b$ at the end of the vibrating portion 222 opposite to the connection portion 221 and the peripheral edge of the reflecting plane portion 230 is assumed to be W4.

The distance between the connection portion 221 and the reflecting plane portion 230 in the Y-axis direction is assumed to be TD. In the longitudinal section illustrated in FIG. 7, the angle defined by the virtual line VL parallel to the reflecting plane portion 230 and a straight line CL connecting the end and the root of the back surface 220$b$ of the vibrating portion 222 is assumed to be θ. The aspect ratio of the back surface 220$b$ of the vibrating portion 222 in the longitudinal section illustrated in FIG. 7 is assumed to be ΔR. It should be noted that the relationship indicated by ΔR=W2/T4 is satisfied. The shortest distance between the peripheral edge 223 of the back surface 220$b$ at the end of the vibrating portion 222 opposite to the connection portion 221 and the peripheral edge of the reflecting plane portion 230 is assumed to be L. The wavelength of the vibration wave emitted from the vibrating portion 222 is assumed to be λ.

A simulation analysis was performed when TD=0 and T4=0.5 mm, 0.75 mm, 1 mm, 1.6 mm, and 1.79 mm in the range 5.7 mm≤R1≤13 mm (0 mm≤W4≤7.3 mm) where R1 was a parameter, for example.

Other example dimensions were as follows: R2=3.5 mm, R3=5.7 mm, R4=R1+2 mm, T11=5 mm, T12=0.4 mm, T13=0.5 mm, T14=0.4 mm, T15=5 mm, T16=1 mm, W1=0.6 mm, W2=1.6 mm, and W3=0.6 mm. The value of T3 was adjusted as appropriate according to the value of T4 by assuming that T3+T4=1.8 mm, for example. When T4 changes from 0.5 mm to 1.79 mm, angle θ changes from 17.4° to 48.2°, for example.

Alternatively, for example, R2 may also be not less than 0 mm and not more than 10 mm. T11 may also be not less than 0.1 mm and not more than 30 mm, for example. T12 may also be not less than 0.1 mm and not more than 5 mm, for example. T13 may also be not less than 0.1 mm and not more than 5 mm, for example. T14 may also be not less than 0.1 mm and not more than 5 mm, for example. T15 may also be not less than 0.1 mm and not more than 30 mm, for example. T16 may also be not less than 0.1 mm and not more than 5 mm, for example. T3 may also be not less than 0 mm and not more than 15 mm, for example. T4 may also be not less than 0.2 mm and not more than 10 mm, for example. W1 may also be not less than 0.1 mm and not more than 10 mm, for example. W2 may also be not less than 0.2 mm and not more than 10 mm, for example. W3 may also be not less than 0.1 mm and not more than 5 mm, for example. The shortest distance (T3+T4) between the peripheral edge 223 of the back surface 220$b$ at the end of the vibrating portion 222 opposite to the connection portion 221 and the reflecting plane portion 230 is preferably meets 0.5λ≤T3+T4≤0.9λ, for example.

Piezoelectric elements were used as the first electromechanical conversion element 211 and the second electromechanical conversion element 212. The materials of the first vibration transmission body 213, the second vibration transmission body 214, and the support body 216 were nickel alloy (42Ni). The materials of the third vibration transmission body 215 and the vibrating body 220 were aluminum alloy (A7075).

The vibrator 210 was driven by applying a voltage of 2 Vpp with a frequency of 114.1 kHz (λ=2.98 mm) to the piezoelectric body. In the vibration wave radiating device according to preferred embodiment 2 of the present invention, the maximum sound pressure of the vibration wave at a position 50 mm away from the end of the vibrating body 220 in the Y-axis direction on the central axis C before the vibrator 210 was driven was calculated.

Figure 8:
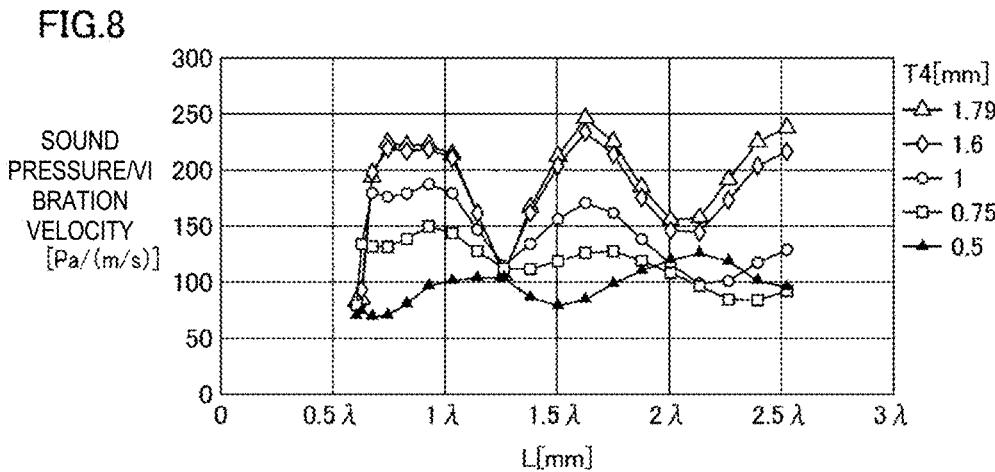
FIG. 8 is a graph illustrating the relationship between the sound pressure per unit vibration velocity and the shortest distance L in the simulation analysis of the vibration wave radiating device according to preferred embodiment 2 of the present invention.

FIG. 8 is a graph illustrating the relationship between the sound pressure per unit vibration velocity and the shortest distance L in the simulation analysis of the vibration wave radiating device according to preferred embodiment 2 of the present invention. In FIG. 8, the vertical axis represents the sound pressure (Pa/(m/s)) per unit vibration velocity, and the horizontal axis represents the shortest distance L (mm).

As illustrated in FIG. 8, the sound pressure per unit vibration velocity periodically varied with the shortest distance L when T4 was 0.5 mm, 0.75 mm, 1 mm, 1.6 mm, and 1.79 mm, for example. The following conditions are preferably met to increase the sound pressure per unit vibration velocity.

When T4 is not less than 1 mm and not more than 1.79 mm, the relationship indicated by 0.63λ≤L is preferably met, for example.

When T4 is 1.79 mm, the relationship indicated by 0.68λ≤L≤1.15λ or 1.38Δ≤L is preferably met, for example. In addition, the relationship indicated by 0.68λ≤L≤1.03λ, 1.5Δ≤L≤1.88λ, or 2.26λ≤L is more preferably met, for example.

When T4 is 1.6 mm, the relationship indicated by 0.68λ≤L≤1.03λ, 1.5λ≤L≤1.88λ, or 2.26λ≤L is preferably met, for example.

When T4 is 1 mm, the relationship indicated by 0.63λ≤L≤2λ or 2.26λ≤L is preferably met, for example. In addition, the relationship indicated by 0.68λ≤L≤1.03λ or 1.5λ≤L≤1.75λ is more preferably met, for example.

When T4 is 0.75 mm, the relationship indicated by 0.6λ≤L is preferably met, for example. In addition, the relationship indicated by 0.63λ≤L≤2λ is more preferably met, for example.

When T4 is 0.5 mm, the relationship indicated by 0.83λ≤L is preferably met, for example. In addition, the relationship indicated by 0.92λ≤L≤1.26λ or 1.75λ≤L is more preferably met, for example.

In accordance with the results of the simulation analysis described above, the relationship indicated by 0.83λ≤L is preferably met when TD=0 and 0.9≤AR≤3.2, for example, to increase the sound pressure per unit vibration velocity in the vibration wave radiating device according to preferred embodiment 2 of the present invention. In addition, the relationship indicated by 0.83λ≤L≤2λ is preferably met when TD=0 and 0.9≤AR≤3.2, for example, to prevent the vibration wave radiating device from becoming larger.

Figure 9:
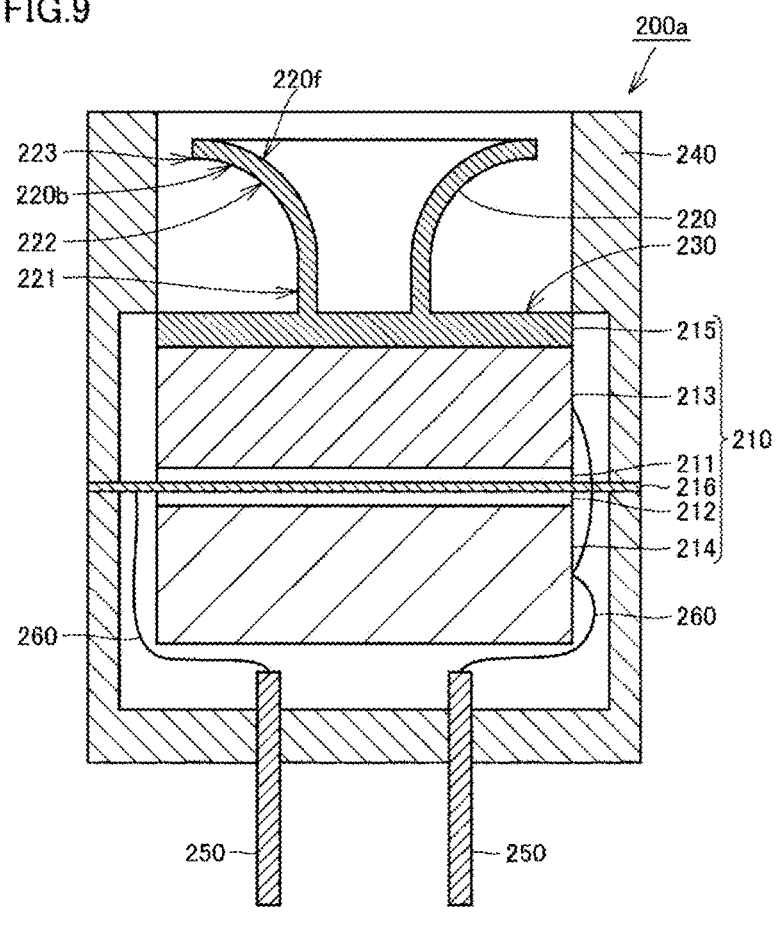
FIG. 9 is a longitudinal sectional view illustrating the structure of a vibration wave radiating device according to a modification of preferred embodiment 2 of the present invention.

It should be noted that the vibration wave radiating device may be housed in a housing. FIG. 9 is a longitudinal sectional view illustrating the structure of a vibration wave radiating device according to a modification of preferred embodiment 2 of the present invention. As illustrated in FIG. 9, a vibration wave radiating device 200a according to the modification of preferred embodiment 2 of the present invention further includes a housing 240, electrodes 250, and wiring 260.

The vibrator 210, the vibrating body 220, and the reflecting plane portion 230 are housed in the housing 240. The top of the housing 240 is open. It should be noted that the top of the housing 240 may be covered with a network structure through which the vibration wave can pass. The electrodes 250 are drawn to the outside from the bottom of the housing 240. The electrodes 250 are electrically connected to the vibrator 210 via the wiring 260. The structure in the modification may be applied to a vibration wave radiating device according to another preferred embodiment.

Preferred Embodiment 3

A vibration wave radiating device according to preferred embodiment 3 of the present invention will be described below with reference to the drawings. Since the vibration wave radiating device according to preferred embodiment 3 of the present invention differs from the vibration wave radiating device 100 according to preferred embodiment 1 of the present invention in mainly the structures of the vibrating body and the reflecting plane portion, the structures similar to those of the vibration wave radiating device 100 according to preferred embodiment 1 of the present invention will not be described.

Figure 10:
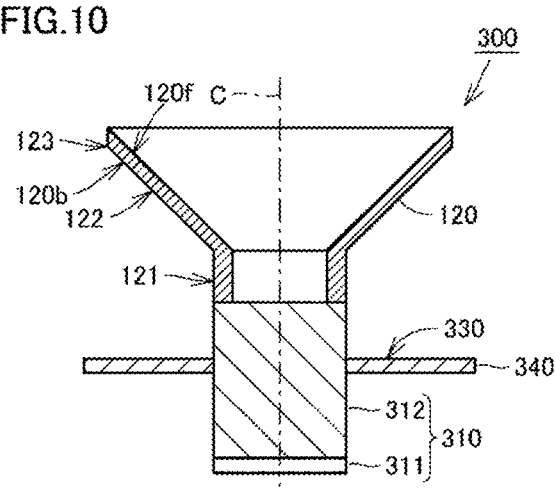
FIG. 10 is a longitudinal sectional view illustrating the structure of a vibration wave radiating device according to preferred embodiment 3 of the present invention.

FIG. 10 is a longitudinal sectional view illustrating the structure of the vibration wave radiating device according to preferred embodiment 3 of the present invention. As illustrated in FIG. 10, a vibration wave radiating device 300 according to preferred embodiment 3 of the present invention includes a vibrator 310, a vibrating body 120, and a reflecting plane portion 330.

In the present preferred embodiment, the vibrator 310 includes the electromechanical conversion element 111 and the vibration transmission body 312. The vibration transmission body 312 may be made of a metal or a resin. The vibrator 310 has a cylindrical or substantially cylindrical shape.

The reflecting plane portion 330 faces the back surface 120b of the vibrating body 120 with a space therebetween. In the present preferred embodiment, the reflecting plane portion 330 is a surface of a flat plate 340, which is a different member from the vibrator 310, close to the vibrating body 120. The flat plate 340 has an annular shape and is disposed coaxially with the vibrator 310 so as to surround the vibrator 310. The flat plate 340 and the vibrator 310 may be in contact with each other or may be spaced apart from each other. The material of the flat plate 340 may also be a resin or a metal, such as aluminum alloy, stainless steel, nickel alloy, or copper alloy.

The peripheral edge of the reflecting plane portion 330 has a circular shape that is coaxial with the central axis C of the vibrating portion 122 and located outside the vibrating portion 122 as viewed in a direction orthogonal to the reflecting plane portion 330. That is, the radius of the peripheral edge of the reflecting plane portion 330 is greater than the radius of the peripheral edge of the vibrating portion 122. It should be noted that the shape of the peripheral edge of the reflecting plane portion 330 is not limited to a circular shape as viewed in the direction orthogonal to the reflecting plane portion 330.

The following describes the results of a simulation analysis with a finite element method of the vibration wave radiating device according to preferred embodiment 3 of the present invention.

Figure 11:
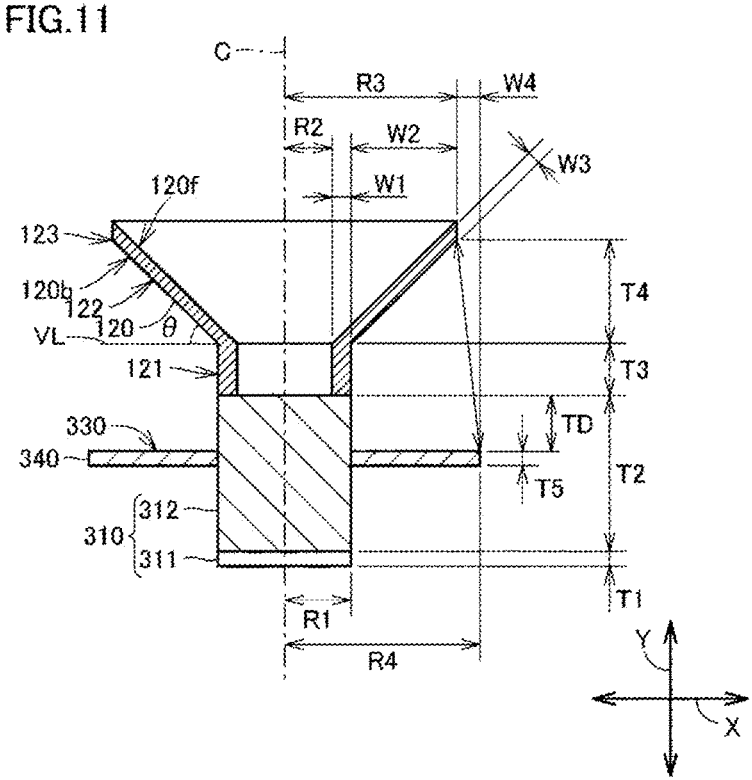
FIG. 11 is a longitudinal sectional view illustrating the dimensional conditions of a simulation analysis of the vibration wave radiating device according to preferred embodiment 3 of the present invention.

FIG. 11 is a longitudinal sectional view illustrating the dimensional conditions of the simulation analysis of the vibration wave radiating device according to preferred embodiment 3 of the present invention. In the longitudinal section illustrated in FIG. 11, the direction parallel to the reflecting plane portions 330 is assumed to be the X-axis direction, and the direction orthogonal to the reflecting plane portions 330 is assumed to be the Y-axis direction.

The radius dimension of the vibrator 310 is assumed to be R1. The inner radius dimension of the connection portion 121 is assumed to be R2. The radius dimension of the peripheral edge of the back surface 120b at the end of the vibrating portion 122 is assumed to be R3. The radius dimension of the peripheral edge of the reflecting plane portion 330 is assumed to be R4. The thickness dimension of the electromechanical conversion element 111 is assumed to be T1. The thickness dimension of the vibration transmission body 312 is assumed to be T2. The height dimension of the connection portion 121 is assumed to be T3. The height dimension of the back surface 120b of the vibrating portion 122 in the Y-axis direction is assumed to be T4. The thickness dimension of the flat plate 340 is assumed to be T5.

The thickness dimension of the connection portion 121 is assumed to be W1. The width dimension of the back surface 120b of the vibrating portion 122 in the X-axis direction is assumed to be W2. The thickness dimension of the vibrating portion 122 is assumed to be W3. The distance in the X-axis direction between the peripheral edge 123 of the back surface 120b at the end of the vibrating portion 122 opposite to the connection portion 121 and the peripheral edge of the reflecting plane portion 130 is assumed to be W4.

The distance in the Y-axis direction between the connection portion 121 and the reflecting plane portion 330 is assumed to be TD. In the longitudinal section illustrated in FIG. 11, the angle defined by the virtual line VL parallel to the reflecting plane portion 330 and the back surface 120b of the vibrating portion 122 is assumed to be θ. The shortest distance between the peripheral edge 123 of the back surface 120b at the end of the vibrating portion 122 opposite to the connection portion 121 and the peripheral edge of the reflecting plane portion 330 is assumed to be L. The wavelength of the vibration wave emitted from the vibrating portion 122 is assumed to be λ.

A simulation analysis was performed when TD=0.1 mm, 0.3 mm, 0.5 mm, 0.7 mm, 0.9 mm, and 1.1 mm in the range 5.4 mm≤R4≤15 mm (0 mm≤W4≤7 mm) where R4 and TD were example parameters.

Other example dimensions were as follows: R1=4.1 mm, R2=3.5 mm, R3=5.6 mm, T1=0.4 mm, T2=7.6 mm, T3=0.1 mm, T4=1.5 mm, T5=1 mm, W1=0.6 mm, W2=1.5 mm, and W3=0.6 mm. The angle θ was assumed to be 45°. The shortest distance (T3+T4+TD) between the peripheral edge 123 of the back surface 120b at the end of the vibrating portion 122 opposite to the connection portion 121 and the reflecting plane portion 330 preferably meets $0.5\lambda \leq T3+T4+TD \leq 0.9\lambda$.

A piezoelectric element was used as the electromechanical conversion element 111. The materials of the vibration transmission body 312 and the vibrating body 120 were aluminum alloy (A7075). The material of the flat plate 340 was ABS resin. The flat plate 340 and the vibrator 310 were slightly apart from each other such that the flat plate 340 did not vibrate.

The vibrator 310 was driven by applying a voltage of 2 Vpp with a frequency of 116.6 kHz ($\lambda$=3.01 mm) to the piezoelectric body. In the vibration wave radiating device according to preferred embodiment 3 of the present invention, the maximum sound pressure of the vibration wave at a position 50 mm away from the end of the vibrating body 120 in the Y-axis direction on the central axis C before the vibrator 310 was driven was calculated.

Figure 12:
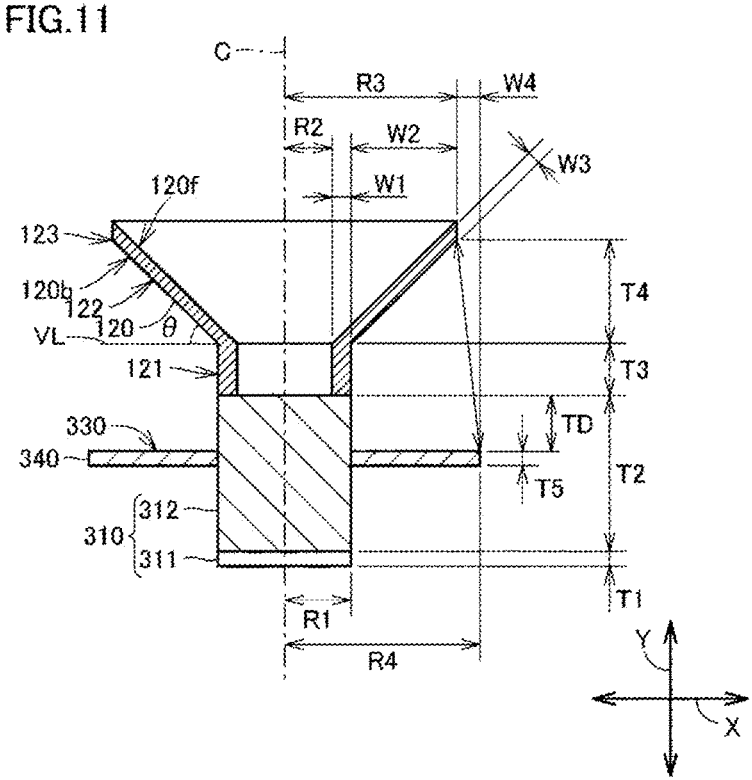
FIG. 12 is a graph illustrating the relationship between the sound pressure per unit vibration velocity and the shortest distance L in the simulation analysis of the vibration wave radiating device according to preferred embodiment 3 of the present invention.

FIG. 12 is a graph illustrating the relationship between the sound pressure per unit vibration velocity and the shortest distance L in the simulation analysis of the vibration wave radiating device according to preferred embodiment 3 of the present invention. In FIG. 12, the vertical axis represents the sound pressure (Pa/(m/s)) per unit vibration velocity, and the horizontal axis represents the shortest distance L (mm).

As illustrated in FIG. 12, the sound pressure per unit vibration velocity periodically varied with the shortest distance L when TD was 0.1 mm, 0.3 mm, 0.5 mm, 0.7 mm, 0.9 mm, and 1.1 mm, for example. The following conditions are preferably met to increase the sound pressure per unit vibration velocity.

When TD is 0.1 mm, the relationship indicated by $1.01\lambda \leq L \leq 1.3\lambda$ or $1.81\lambda \leq L\ 2.07\lambda$ is preferably met, for example.

When TD is 0.3 mm, the relationship indicated by $0.85\lambda \leq L \leq 1.28\lambda$ or $1.64\lambda \leq L \leq 2.16\lambda$ is preferably met, for example. In addition, the relationship indicated by $1\lambda \leq L \leq 1.16\lambda$ or $1.83\lambda \leq L \leq 1.9\lambda$ is more preferably met, for example.

When TD is 0.5 mm, the relationship indicated by $0.8\lambda \leq L \leq 1.31\lambda$ or $1.55\lambda \leq L$ is preferably met, for example. In addition, the relationship indicated by $0.87\lambda \leq L \leq 1.2\lambda$ or $1.67\lambda \leq L \leq 1.99\lambda$ is more preferably met, for example.

When TD is 0.7 mm, the relationship indicated by $0.79\lambda \leq L \leq 1.3\lambda$ or $1.52\lambda \leq L$ is preferably met, for example. In addition, the relationship indicated by $0.86\lambda \leq L \leq 1.19\lambda$ or $1.7\lambda \leq L \leq 2.01\lambda$ is more preferably met, for example.

When TD is 0.9 mm, the relationship indicated by $0.86\lambda \leq L \leq 1.25\lambda$, $1.56\lambda \leq L \leq 2.04\lambda$, or $2.36\lambda \leq L$ is preferably met, for example.

When TD is 1.1 mm, the relationship indicated by $0.93\lambda \leq L \leq 1.15\lambda$ or $1.66\lambda \leq L \leq 1.83\lambda$ is preferably met, for example.

In accordance with the results of the simulation analysis described above, the relationship indicated by $1.01\lambda \leq L \leq 1.15\lambda$ or $1.81\lambda \leq L \leq 1.83\lambda$ is preferably met when $\theta$=45° and $0.1 \leq TD \leq 1.1$, for example, to increase the sound pressure per unit vibration velocity in the vibration wave radiating device according to preferred embodiment 3 of the present invention.

Preferred Embodiment 4

A vibration wave radiating device according to preferred embodiment 4 of the present invention will be described below with reference to the drawings. Since the vibration wave radiating device according to preferred embodiment 4 of the present invention differs from the vibration wave radiating device 300 according to preferred embodiment 3 of the present invention in mainly the structures of the vibrating body and the reflecting plane portion, the structures similar to those of the vibration wave radiating device 300 according to preferred embodiment 3 of the present invention will not be described.

Figures 13, 14:
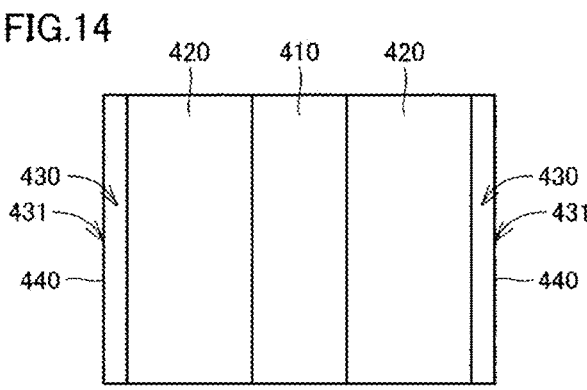
FIG. 13 is a longitudinal sectional view illustrating the structure of a vibration wave radiating device according to preferred embodiment 4 of the present invention.
FIG. 14 is a plan view of the vibration wave radiating device in FIG. 13 as viewed in the direction of arrow XIV.

FIG. 13 is a longitudinal sectional view illustrating the structure of the vibration wave radiating device according to preferred embodiment 4 of the present invention. FIG. 14 is a plan view of the vibration wave radiating device in FIG. 13 as viewed in the direction of arrow XIV. As illustrated in FIGS. 13 and 14, a vibration wave radiating device 400 according to preferred embodiment 4 of the present invention includes a vibrator 410, a vibrating body 420, and reflecting plane portions 430.

In the present preferred embodiment, the vibrator 410 includes an electromechanical conversion element 411 and a vibration transmission body 412. The vibrator 410 has a quadrangular prism shape.

The vibrating body 420 is connected to the vibrator 410 and includes a front surface 420*f* and a back surface 420*b* that is close to the vibrator 410 and faces away from the front surface 420*f*. The vibrating body 420 includes the connection portion 421 and a pair of vibrating portions 422.

The connection portion 421 is connected to the vibrator 410. In the present preferred embodiment, the connection portion 421 is shaped like a pair of plates that extend in a direction orthogonal to the reflecting plane portions 430 and face each other with a space therebetween. However, the shape of the connection portion 421 is not limited to a pair of plates and may be a single plate.

The pair of vibrating portions 422 extends from an end portion of the connection portion 421 opposite to the vibrator 410 so as to be spaced away from the reflecting plane portions 430 while being spaced apart from each other and includes the back surfaces 420*b* that faces the reflecting plane portions 430. In a longitudinal section, the pair of vibrating portions 422 extends from the connection portion 421 so as to be spaced apart from each other while being inclined and is located in line-symmetric with each other about the central axis C. As illustrated in FIG. 14, the pair of vibrating portions 422 is shaped like rectangles spaced apart from each other as viewed in the direction orthogonal to the reflecting plane portions 430. That is, the pair of vibrating portions 422 is shaped like a pair of rectangular plates diagonally facing each other with a space therebetween.

Edges 423 of the back surfaces 420*b* at the ends of the pair of vibrating portions 422 opposite to the connection portion 421 extend as two straight lines. It should be noted that the shape of the pair of vibrating portions 422 is not limited to a pair of rectangular plates and may be any shape that has open spaces in which the vibration wave propagates between the back surfaces 420*b* of the vibrating portions 422 and the reflecting plane portions 430.

The material of the vibrating body 420 may also be a resin or a metal, such as aluminum alloy, stainless steel, nickel alloy, or copper alloy. The vibrating body 420 may be made of the same material as the member of the vibrator 410 or the reflecting plane portions 430 and integrated with the vibrator 410 or the reflecting plane portions 430 or may be a different member connected to the member of the vibrator 410 or the reflecting plane portions 430.

The reflecting plane portions 430 face the back surfaces 420*b* of the vibrating bodies 420 with spaces therebetween. In the present preferred embodiment, the reflecting plane portions 430 are the surfaces of a pair of flat plates 440, which are different members from the vibrator 410, close to the vibrating bodies 420. Each of the pair of flat plates 440 has a rectangular shape. The pair of flat plates 440 are disposed so as to sandwich the vibrator 410 therebetween. The pair of flat plates 440 and the vibrator 410 may be in contact with each other or may be spaced apart from each other. The material of the pair of flat plates 440 may also be a resin or a metal, such as aluminum alloy, stainless steel, nickel alloy, or copper alloy.

The peripheral edges of the reflecting plane portions 430 are a pair of rectangles surrounding the pair of vibrating portions 422, respectively, from the outside as viewed in a direction orthogonal to the reflecting plane portions 430. Specifically, the edges 431 of the reflecting plane portions 430 opposite to the vibrator 410 are located outside the edges 423 of the back surfaces 420b at the ends of the pair of vibrating portions 422 as viewed in the direction orthogonal to the reflecting plane portions 430.

The following describes the results of a simulation analysis with a finite element method of the vibration wave radiating device according to preferred embodiment 4 of the present invention.

Figures 15, 16:
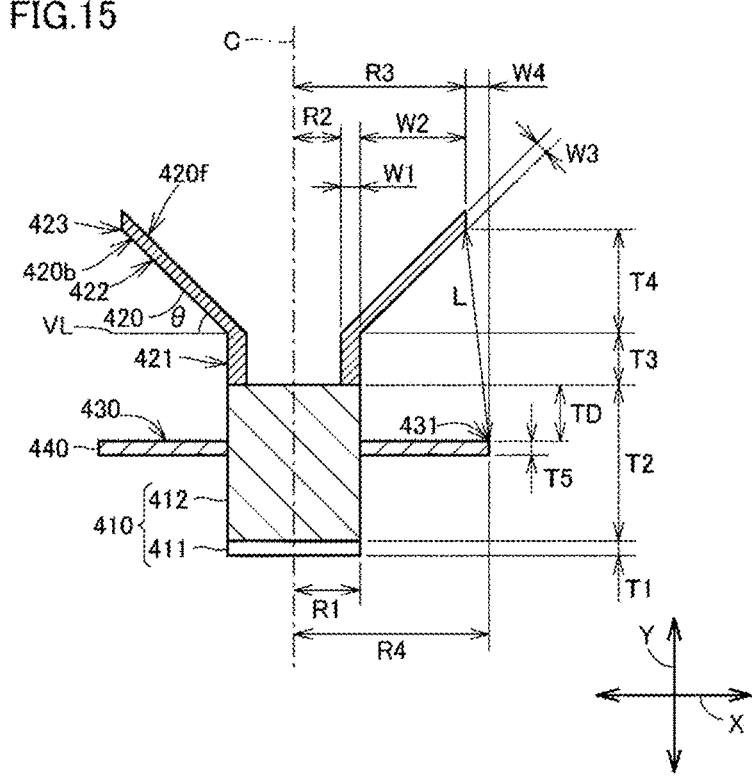
FIG. 15 is a longitudinal sectional view illustrating the dimensional conditions of a simulation analysis of the vibration wave radiating device according to preferred embodiment 4 of the present invention.
FIG. 16 is a graph illustrating the relationship between the sound pressure per unit vibration velocity and the shortest distance L in the simulation analysis of the vibration wave radiating device according to preferred embodiment 4 of the present invention.

FIG. 15 is a longitudinal sectional view illustrating the example dimensional conditions of the simulation analysis of the vibration wave radiating device according to preferred embodiment 4 of the present invention. In the longitudinal section illustrated in FIG. 15, the direction parallel to the reflecting plane portions 430 is assumed to be the X-axis direction, and the direction orthogonal to the reflecting plane portions 430 is assumed to be the Y-axis direction.

The dimension half the width of the vibrator 410 is assumed to be R1. The shortest distance in the X-axis direction from the central axis C to the connection portion 421 is assumed to be R2. The shortest distance in the X-axis direction from the central axis C to an edge 423 of the back surface 420b at the end of the vibrating portion 422 is assumed to be R3. The shortest distance in the X-axis direction from the central axis C to an edge 431 of the reflecting plane portion 430 opposite to the vibrator 410 is assumed to be R4.

The thickness dimension of the electromechanical conversion element 111 is assumed to be T1. The thickness dimension of the vibration transmission body 412 is assumed to be T2. The height dimension of the connection portion 421 is assumed to be T3. The height dimension of the back surface 420b of the vibrating portion 422 in the Y-axis direction is assumed to be T4. The thickness dimension of the flat plate 440 is assumed to be T5.

The thickness dimension of the connection portion 421 is assumed to be W1. The width dimension of the back surface 420b of the vibrating portion 422 in the X-axis direction is assumed to be W2. The thickness dimension of the vibrating portion 422 is assumed to be W3. The distance in the X-axis direction between the edge 423 of the back surface 420b at the end of the vibrating portion 422 opposite to the connection portion 421 and the edge 431 of the reflecting plane portion 430 opposite to the vibrator 410 is assumed to be W4.

The distance in the Y-axis direction between the connection portion 421 and the reflecting plane portion 430 is assumed to be TD. In the longitudinal section illustrated in FIG. 15, the angle defined by the virtual line VL parallel to the reflecting plane portion 430 and the back surface 420b of the vibrating portion 422 is assumed to be θ. The shortest distance between the edge 423 of the back surface 420b at the end of the vibrating portion 422 opposite to the connection portion 421 and the edge 431 opposite to the vibrator 410 of the reflecting plane portion 430 is assumed to be L. The wavelength of the vibration wave emitted from the vibrating portion 422 is assumed to be λ.

A simulation analysis was performed when TD=1.4 mm, 1.6 mm, 1.8 mm, 2 mm, and 2.2 mm in the range 5.4 mm≤R4≤15 mm (0 mm≤W4≤7 mm) where R4 and TD were example parameters.

Other example dimensions were as follows: R1=4 mm, R2=3 mm, R3=5.2 mm, T1=0.4 mm, T2=7.6 mm, T3=0.2 mm, T4=1.2 mm, T5=1 mm, W1=1 mm, W2=1.2 mm, and W3=1 mm. The angle θ was assumed to be 45°. The shape of the vibration wave radiating device 400 was a three-dimensional shape in which the planar shape illustrated in FIG. 15 extends 16 mm in the depth direction of the sheet. The shortest distance (T3+T4+TD) between the edge 423 of the back surface 420b at the end of the vibrating portion 422 opposite to the connection portion 421 and the reflecting plane portion 430 preferably meets 0.65λ≤T3+T4+TD≤0.74λ, for example.

A piezoelectric element was used as the electromechanical conversion element 411. The materials of the vibration transmission body 412 and the vibrating body 420 were aluminum alloy (A7075). The material of the flat plate 440 was ABS resin. The flat plates 440 and the vibrator 410 were slightly spaced apart from each other such that the flat plates 440 did not vibrate.

The vibrator 410 was driven by applying a voltage of 2 Vpp with a frequency of 79 kHz (λ=4.3 mm) to the piezoelectric body. In the vibration wave radiating device according to preferred embodiment 4 of the present invention, the maximum sound pressure of the vibration wave at a position 50 mm away from the end of the vibrating body 420 in the Y-axis direction on the central axis C before the vibrator 410 was driven was calculated.

FIG. 16 is a graph illustrating the relationship between the sound pressure per unit vibration velocity and the shortest distance L in the simulation analysis of the vibration wave radiating device according to preferred embodiment 4 of the present invention. In FIG. 16, the vertical axis represents the sound pressure (Pa/(m/s)) per unit vibration velocity, and the horizontal axis represents the shortest distance L (mm).

As illustrated in FIG. 16, the sound pressure per unit vibration velocity periodically varied with the shortest distance L when TD was 1.4 mm, 1.6 mm, 1.8 mm, 2 mm, and 2.2 mm, for example. The following example conditions are preferably met to increase the sound pressure per unit vibration velocity.

When TD is 1.4 mm, the relationship indicated by 0.65λ≤L is preferably met, for example. In addition, the relationship indicated by 0.8λ≤L≤1.29λ or 1.67λ≤L≤2.05λ is more preferably met, for example.

When TD is 1.6 mm, the relationship indicated by 0.7λ≤L is preferably met, for example. In addition, the relationship indicated by 0.81λ≤L≤1.2λ or 1.68λ≤L≤1.89λ is more preferably met, for example.

When TD is 1.8 mm, the relationship indicated by 0.74λ≤L≤1.26λ or 1.54λ≤L is preferably met, for example.

When TD is 2 mm and 2.2 mm, for example, there was no regions in which the sound pressure could be increased.

In accordance with the results of the simulation analysis described above, the relationship indicated by 0.74λ≤L≤1.26λ or 1.54λ≤L is preferably met when θ=45° and 1.4≤TD≤1.8, for example, to increase the sound pressure per unit vibration velocity in the vibration wave radiating device according to preferred embodiment 4 of the present invention. In addition, the relationship indicated by 0.74λ≤L≤1.26λ or 1.54λL≤2λ is preferably met when θ=45° and 1.4≤TD≤1.8, for example, to prevent the vibration wave radiating device from becoming larger.

In the descriptions of the preferred embodiments described above, various structures, features, and characteristics may be combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration wave radiating device comprising:
a vibrator to generate vibration;
a vibrating body connected to the vibrator and including a front surface and a back surface closer to the vibrator and facing away from the front surface; and
a reflecting plane portion facing the back surface of the vibrating body with a space therebetween; wherein
the vibrating body includes a connection portion connected to the vibrator and a vibrating portion extending away from the reflecting plane portion and extending from an end portion of the connection portion opposite to the vibrator, the vibrating portion including the back surface facing the reflecting plane portion;
the vibrating portion has a tubular shape linearly increasing in diameter from the connection portion in a longitudinal section;
a peripheral edge of the reflecting plane portion is coaxial with a central axis of the vibrating portion and located outside the vibrating portion as viewed in a direction orthogonal to the reflecting plane portion; and
when a distance between the connection portion and the reflecting plane portion in the direction orthogonal to the reflecting plane portion is TD, an angle defined by a virtual line parallel to the reflecting plane portion and the back surface of the vibrating portion in the longitudinal section is $\theta$, a shortest distance between a peripheral edge of the back surface at an end of the vibrating portion opposite to the connection portion and the peripheral edge of the reflecting plane portion is L, and a wavelength of a vibration wave emitted from the vibrating portion is $\lambda$, a relationship indicated by $0.78\lambda \leq L \leq 1.19\lambda$ or $1.5\lambda \leq L \leq 2.14\lambda$ is satisfied when TD=0 and $35° \leq \theta \leq 55°$.

2. The vibration wave radiating device according to claim 1, wherein a relationship indicated by $0.78\lambda \leq L \leq 1.19\lambda$ or $1.5\lambda \leq L \leq 2\lambda$ is satisfied when TD=0 and $35° \leq \theta \leq 55°$.

3. The vibration wave radiating device according to claim 1, wherein the vibrator includes an electromechanical converter and a vibration transmitter.

4. The vibration wave radiating device according to claim 3, wherein the electromechanical converter includes one of a piezoelectric element, a magnetostrictive element, or an electrostrictive element.

5. The vibration wave radiating device according to claim 1, wherein the vibrator is one of a Langevin vibrator, a monomorph vibrator, or a bimorph vibrator.

* * * * *